Figure 3:
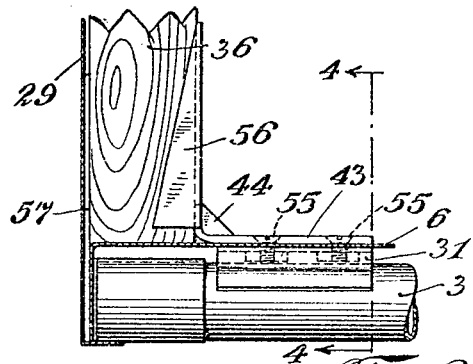

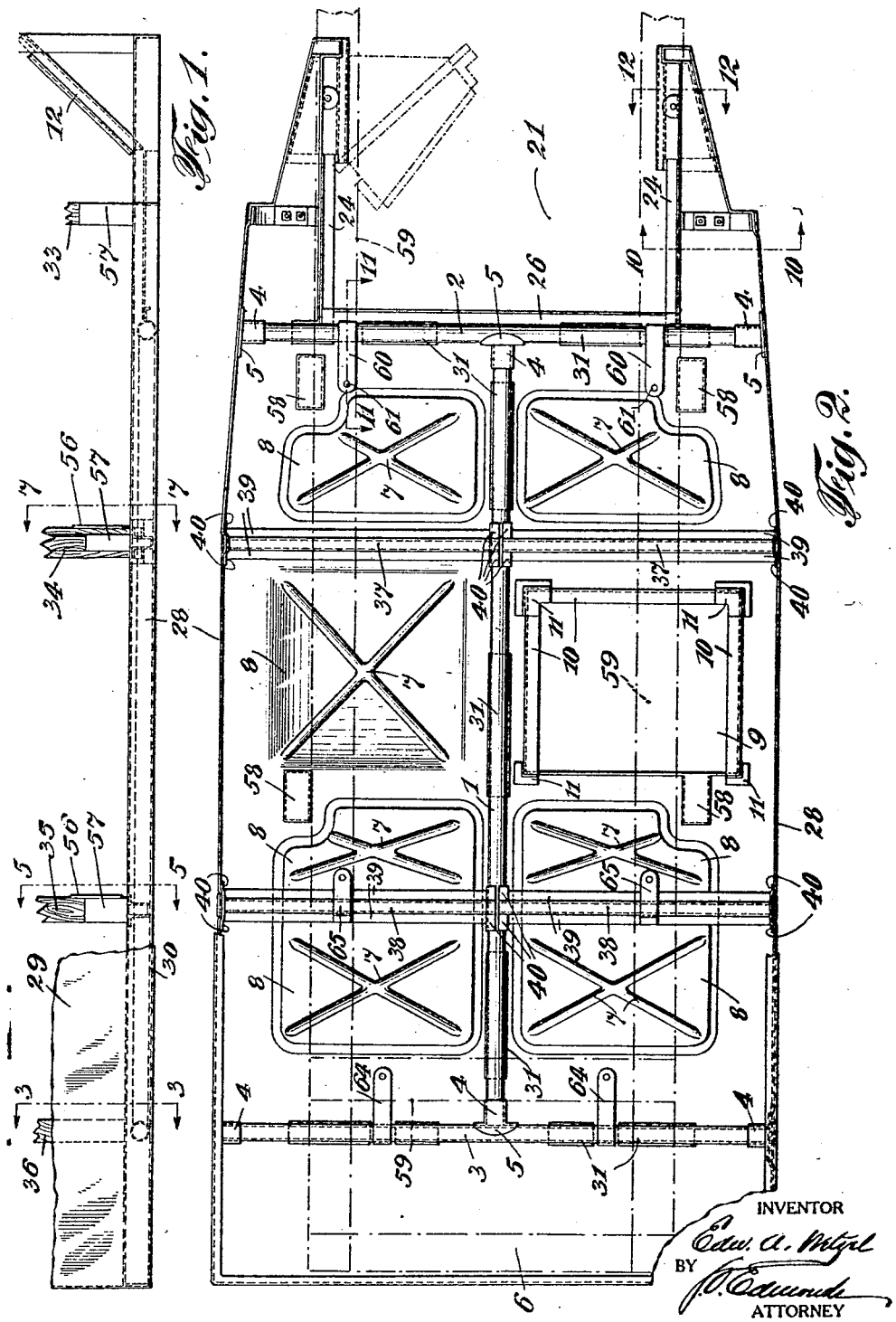
April 12, 1927.  E. A. WETZEL  1,624,903
VEHICLE UNDERBODY CONSTRUCTION
Filed Dec. 5, 1923   3 Sheets-Sheet 1
INVENTOR
Edw. A. Wetzel
BY
ATTORNEY April 12, 1927.

E. A. WETZEL 1,624,903

VEHICLE UNDERBODY CONSTRUCTION

Filed Dec. 5, 1923 3 Sheets-Sheet 2

INVENTOR
Edw. A. Wetzel
BY
ATTORNEY

April 12, 1927.
E. A. WETZEL
1,624,903
VEHICLE UNDERBODY CONSTRUCTION
Filed Dec. 5, 1923
3 Sheets-Sheet 3
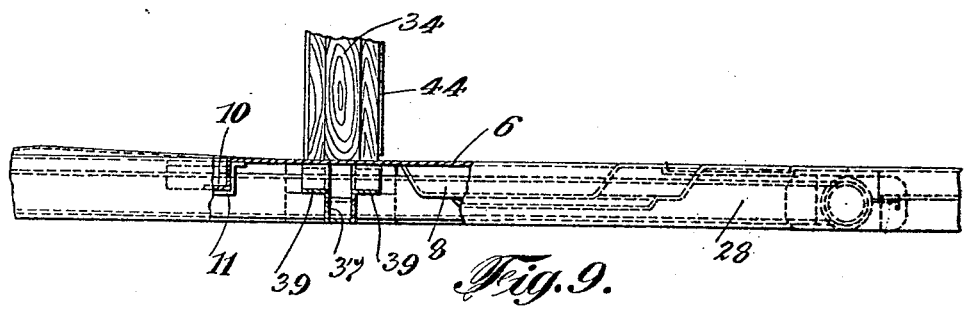
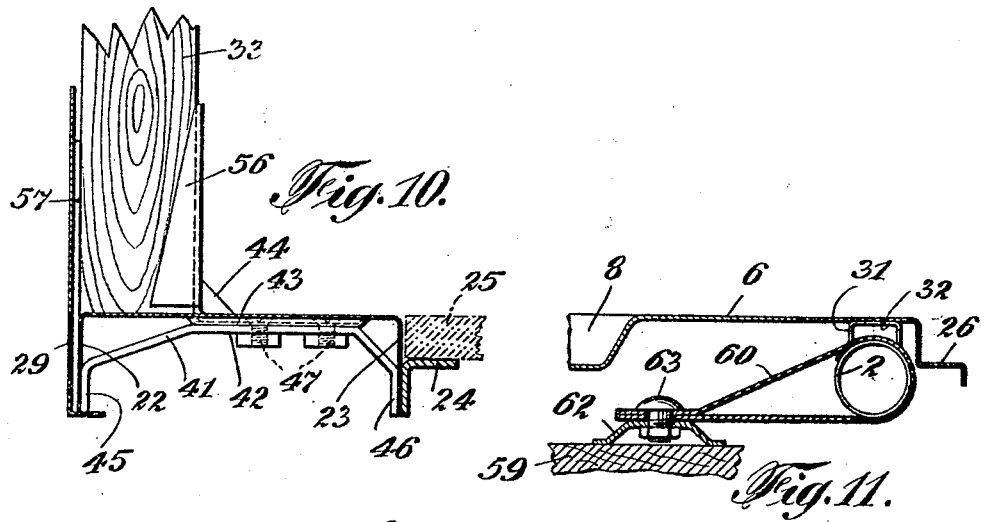
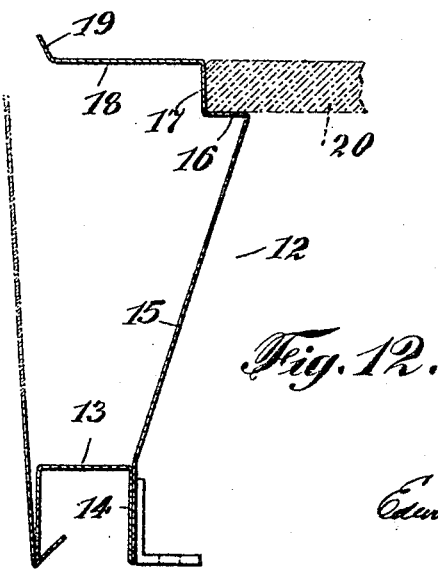
INVENTOR
Edward A. Wetzel
BY
J. O. Edmunds
ATTORNEY Patented Apr. 12, 1927.

1,624,903

UNITED STATES PATENT OFFICE.

EDWARD A. WETZEL, OF ROYAL OAK, MICHIGAN, ASSIGNOR TO THE AMERICAN MOTOR BODY CORPORATION, OF PHILADELPHIA, PENNSYLVANIA, A CORPORATION OF DELAWARE.

VEHICLE UNDERBODY CONSTRUCTION.

Application filed December 5, 1923. Serial No. 678,566.

This invention relates to underbody construction for vehicles, and more particularly relates to an underbody construction adapted to be used with all-steel or with composite vehicle bodies.

The principal object of my invention is to provide an underbody construction for vehicles which is strong and durable; which comprises few parts; which lends itself to being made light in weight and at the same time having ample strength and rigidity; and a construction which is simple and economical to manufacture in large quantities, conserving time, labor and expense, without sacrificing desirable qualities or characteristics. A further object of my invention is to provide an underbody construction which may be applied to vehicle bodies of either the composite or the all-steel type, and one which is especially well suited for automobile bodies. A further object of my invention is to provide a floor or sill panel construction which is inherently strong, rigid and light, and one which requires a minimum of bracing and reenforcement by additional elements or separate parts. A further object of my invention is to provide an underbody construction which lends itself to being readily and easily mounted, permanently or detachably, upon and secured to a chassis frame, or the like. Other objects will be in part obvious and in part pointed out hereinafter.

The invention accordingly consists in the features of construction, combinations of elements and arrangement of parts which will be exemplified in the construction hereinafter set forth and the scope of the application of which will be indicated in the following claims.

Heretofore it has been the practice to have the steel sills of the underbody construction made up in a box or girder section running lengthwise of the body on opposite sides, or to provide a skeleton frame along the sides of the body wherein the sills are formed at the bottom of the frame and then attached to the body with cross pieces, usually of channel or angle shape in cross section. A shell is attached to such skeleton frame to give the desired outward shape and appearance to the body.

In accordance with my invention, however, the underbody construction includes a tubular skeleton frame, comprising a metal tube running lengthwise in the center of the body or a metal tube at each side of the body running lengthwise, or other arrangement of metal tubes, thus obtaining with less weight greater strength and resistance to strains than is possible with members having angular cross section, such as angle, channel or box cross section, or I-beams.

Other tubes may be associated with and be attached to the tubes above mentioned to provide skeleton frames of various different forms, each member thereof thus incorporating the increased resistance and strength in proportion to the weight, inherent to metallic tubular formations. The tubes are rigidly secured together, as by welding. I employ such a tubular skeleton frame to support and to reenforce a floor panel or sill panel which is rigidly secured to the frame, as by welding. Such a panel may be constructed of sheet metal and may consist of a single integral piece formed to the desired size and shape, as by a stamping operation, previous to mounting. This panel may be reenforced by beads, ribs and depressions formed integrally thereon, and with suitable supports or braces, which also may be formed integrally on the panel, or which, if desired, may be formed separately and then be attached to the panel, as by riveting, welding or the like. The complete floor or sill panel, however, may be formed from several pieces of metal suitably secured together, although the one-piece construction requires fewer manufacturing operations and less labor and time in assembling.

Figure 4:
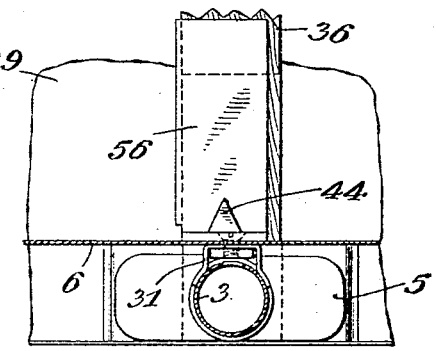
Figure 5:
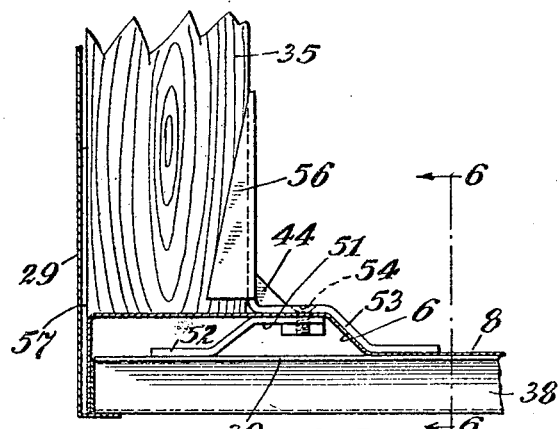
Figure 6:
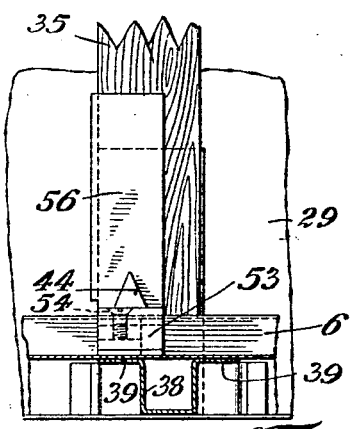
Figure 7:
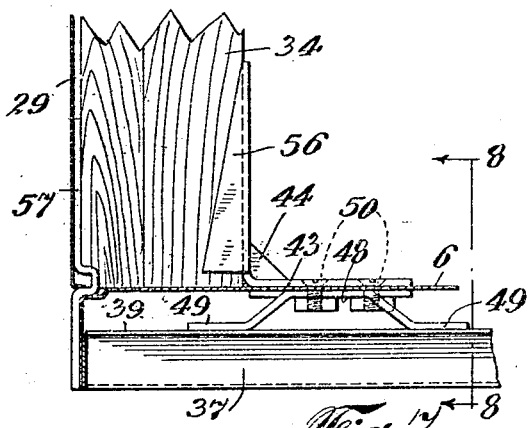
Figure 8:
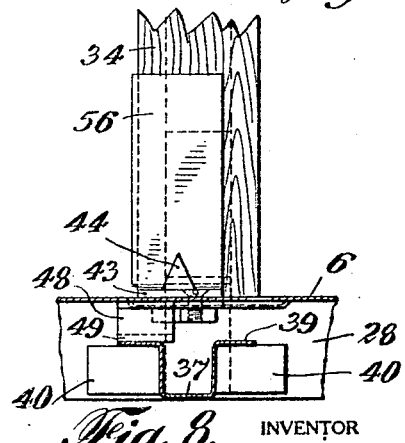

In order that a clearer understanding of my invention may be had, attention is hereby directed to the accompanying drawings forming a part of this application and illustrating certain possible embodiments of my invention. In the drawings, Fig. 1 is a side view of an underbody construction embodying my invention, showing fragments of body stakes and paneling associated therewith; Fig. 2 is a bottom view of the underbody construction; Fig. 3 is a vertical sectional view of a portion of the construction and is taken on the line 3—3 of Fig. 1; Fig. 4 is a vertical sectional view of the same portion of the structure and is taken on the line 4—4 of Fig. 3; Fig. 5 is a vertical sectional view of another portion of the structure and is taken on the line 5—5 of Fig. 1; Fig. 6 is a vertical sectional view of the same part of the structure and is taken on the line 6—6 of Fig. 5; Fig. 7 is a vertical sectional view of another portion of the structure and is taken on the line 7—7 of Fig. 1; Fig. 8 is a vertical section of the same part of the structure and is taken on the line 8—8 of Fig. 7; Fig. 9 is a side view of a portion of the construction, certain parts being broken away to more clearly bring out the construction; Fig. 10 is a vertical sectional view through a forward part of the structure and is taken on the line 10—10 of Fig. 2; Fig. 11 is a vertical sectional view with another portion of the structure and is taken on the line 11—11 of Fig. 2; and Fig. 12 is a vertical sectional view of the extreme front portion of the structure and is taken on the line 12—12 of Fig. 2. Similar reference characters refer to similar parts throughout the several views of the drawings.

Referring to the drawings, the underbody construction includes a skeleton frame which may be built according to various designs, but which in the drawings, for purpose of example, is shown to comprise a metallic center tube 1 positioned lengthwise in the center of the body and metallic cross tubes 2 and 3, each attached to one end of the tube 1 and extending from side to side of the body. To each end of these tubes is secured a metallic cap member, such as 4, each having its outer end 5 flared to provide enlarged attachment surfaces, whereby the parts carrying the caps may be secured to other metallic parts by welding or by other suitable means. The increased attachment areas provided by the caps facilitate making the attachments and render the joints extra strong and durable.

The sill or floor panel or pan 6 is attached to and supported by the skeleton frame, the construction being suitably braced and reenforced, as will be described more particularly hereinafter.

The sill or floor pan 6 may be formed in a single integral piece of sheet metal, or it may be built up of several formed sections suitably secured together. In the drawings is illustrated a one-piece pan 6, beaded or ribbed wherever necessary or convenient, as at 7, to give rigidity and strength. The pan 6 has the portions 8, which come under the seats, depressed to secure greater strength at these places. There is an opening 9 in the left-hand side of the pan between the portions 8, and the edges of this opening are flanged downwardly, and then inwardly, as at 10, on three sides, forming a seat for a battery opening cover, which can be either of wood or of metal, as desired. At each corner of opening 9, reenforcing strips, such as 11, are secured to the pan, as by welding, for strength and to prevent shearing of the pan at this locality.

On each side of pan 6, at the front, there is a toe riser 12. To form these toe riser portions 12 (see Fig. 12) the pan is here shaped into inverted-channel portions 13, the inner wall 14 of each being doubled back upon itself and extending upwardly and inwardly, as at 15, then outwardly, as at 16, then vertically, as at 17, then outwardly, as at 18, and ending in an upturned flange 19. Flanges 16 and 17 constitute seats for toe boards 20, and flanges 19 serve as seats for trim pieces. The toe riser portions may be strengthened by being ribbed or beaded, if desired.

The opening 21 between the two toe risers extends for a distance rearwardly into the panel, providing a floor board opening. Along each side of this opening the panel has a depending outer flange 22 and a depending inner flange 23 (see Fig. 10). The inner flanges are reenforced with angle iron strips 24 which also constitute seats for floor boards 25. Along the rear edge of the opening 21 the panel is turned downwardly, and then outwardly, as at 26, forming a seat for floor boards, and strengthening the panel. If desired, the ends of flange 26 may be strengthened and reenforced against shearing at these places, as by attaching angle iron reenforcements 24 thereto. The ends of this flange may be offset outwardly to provide recesses in which the ends of angle irons 24 may be welded. The outside edge of the floor or sill pan is formed with a downward flange 28 upon which suitable body paneling 29 may be attached by crimping, as at 30, and by spot welding or by other means. This flange 28 is attached, by welding or by other means, to the flared ends 5 of the caps 4 on the ends of the cross tubes 2 and 3 of the skeleton frame. Metallic spacers or clips 31 are secured to the tubes 1, 2 and 3 at suitable places, as by welding, and the sill pan 6 is welded to these spacers. The spacers 31 present increased welding surface to the pan, and the character of the welding surface is such that the pan will not burn when the welding is performed, as would be apt to happen if the pan were welded directly to the tubes. The spacers present a welding surface 32 raised from the tubes.

The structure supports body pillars or posts, such as 33, 34, 35 and 36, along each side of the body. Reenforcing and bracing members, such as 37 and 38, extend respectively beneath the panel 6, from the location of the posts 34 and 35, to the central tube 1, to which the inner ends of these members are welded. These bracing members may be of channel shape and strengthened with longitudinal outwardly turned flanges 39 which lie against the depressed portions of panel 6 and may be welded thereto. These members 37 and 38 strengthen the structure and act as supports for the pan, for the body pillars or posts, and also for the seats. The ends of the channel members have outwardly turned flanges 40 presenting increased surfaces against the flange 28 of the sill pan and the center tube 1, and to which these members may be secured, as by welding, thus creating a very strong construction between the tubular members of the skeleton frame for supporting pillars and seats.

Under the panel 6 beneath each body pillar or post 33 (see Fig. 10) is a truss or brace 41, formed of flat steel with a horizontal surface 42, and over this surface and panel 6 rests the foot 43 of the brace member 44 which holds the post 33. Parts 42 and 43 and panel 6 may be secured together by bolts 47, or by other means. The ends of brace 41 comprise downwardly turned flanges 45 and 46 adapted to abut and to be welded to the flanges 22 and 23 of the panel 6, flange 46 coming behind the angle iron 24, thus making a very strong construction at this point.

Under the panel 6 beneath each body pillar or post 34 (see Figs. 7 and 8) is a truss brace 48 similar to truss brace 41, except that the ends of the brace are horizontal, as at 49, and are secured to the flanges 39 of the channel supports 37. Bolts 50 secure foot 43 of the bracket 44, panel 6, and brace 48 together.

Under the panel 6 beneath each body pillar or post 35 (see Figs. 5 and 6) is a truss brace 51 similar to truss brace 48, except that it has a truss 52 to the outside of the underbody only, truss 52 being welded to the flange 39 of a channel support 38. Inwardly of truss 51 the pan 6 has the depressed portion 8 which rests upon the flange 39 of channel support 38. The foot of post bracket 44 is shaped, as at 53, to conform to the contour of the panel 6, and thus forms a truss support inwardly of truss 51. The parts may be secured together by bolt 54.

Posts 36 are positioned at the ends of cross tube 4 (see Figs. 3 and 4), and here the foot 43 of each post bracket 44 is secured to a spacer member, such as 31, by means of bolts 55, the panel 6 being between the spacer and the foot.

The upper parts of the post brackets 44 are of angular shape, as at 56, and in conjunction with each bracket 44 it is desirable to employ a flat piece of steel 57 which is applied against and is screwed to the outer face of the post, the plates 57 preferably extending below the post and abutting the outer surface of the panel flange 22 or 28, to which these plates may be welded or may be otherwise secured.

The pan 6 may be suitably pocketed, as at 58, for locating seat structure, which is not shown since such seat structure in itself forms no part of the present invention.

Suitable means may be provided for attaching the underbody to frame members, such as 59, of an automobile chassis or other vehicle frame. To this end band irons 60 (Fig. 11) may be welded to the cross tube 2, the band irons 60 having bolt holes 61 permitting the irons to be attached to the vehicle frame members or to brackets 62 thereon by means of bolts 63. The attachment may be accomplished by other means, if desired. For the same purpose similar band irons 64 may be associated with cross tube 3, and other suitable band strips 65 may be secured to the channel supports 38.

Although, as above stated, by employing tubes in the skeleton frame there is obtained increased strength and resistance to strains in proportion to the weight, non-tubular frame members may be substituted for the tubular members without departing from the scope of this invention.

A sill and floor panel of the character described lends itself to being made in a single integral piece, thus saving the expense, labor and time of constructing this element in several pieces and in assembling and securing the several pieces together. However, in either case, there is thus formed a novel floor or sill panel, reenforced and braced by integral portions thereof.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described, and all statements of the scope of the invention which, as a matter of language, might be said to fall therebetween.

What I claim is:—

1. In vehicle body construction, a separate integral underbody stiffening unit, comprising a central longitudinal tubular member and transverse tubular members integrally united to the longitudinal member, and means on said unit for securing the unit rigidly to the vehicle body across the bottom thereof, with said longitudinal member disposed along the center line of the body and the transverse members extending from one side of the body to the other side thereof.

2. In vehicle body construction, a separate integral underbody stiffening unit, comprising a central longitudinal tubular member and transverse tubular members integrally united to the longitudinal member and means on said unit for securing the unit rigidly to the vehicle body across the bottom thereof, with said longitudinal member disposed along the center line of the body and the transverse members extending from one side of the body to the other side thereof, said means comprising caps secured on the ends of said transverse members and having flaring attachment flanges.

3. In vehicle body construction, a separate integral underbody stiffening unit, comprising a central longitudinal tubular member and transverse tubular members integrally united to the longitudinal member, means on said unit for securing the unit rigidly to the vehicle body across the bottom thereof, with said longitudinal member disposed along the center line of the body and the transverse members extending from one side of the body to the other side thereof, and an integral metal bottom panel having downturned edge flanges secured to the ends of the transverse members of the stiffening unit.

4. In vehicle underbody construction, in combination, a sheet metal floor panel having downwardly directed edge flanges, a tubular reenforcing and stiffening member extending between and secured at its ends beneath the panel to opposite edge flanges thereof, and a spacer disposed between the top of the tubular member and the panel intermediate said ends and flanges.

5. In vehicle underbody construction, in combination, a sheet metal floor panel having downwardly directed edge flanges, a tubular reenforcing and stiffening member extending between and secured at its ends beneath the panel to opposite edge flanges thereof, and a spacer disposed between the top of the tubular member and the panel intermediate said ends and flanges, and a post retaining member disposed over and secured to said spacer, whereby said post retaining member is reinforced by said spacer and tubular member.

6. In vehicle underbody construction, in combination, a sheet metal floor panel having a raised post receiving portion, a straight reenforcing and stiffening member extending beneath and secured to the panel with said raised panel portion spaced therefrom, a brace member disposed between said member and the panel at said raised portion, and a post retaining member supported by and secured to said brace member.

7. In vehicle underbody construction, in combination, a sheet metal floor panel having a raised post receiving portion, a straight reenforcing and stiffening member extending beneath and secured to the panel with said raised panel portion spaced therefrom, a brace member disposed between said member and the panel at said raised portion, and a post retaining member supported by and secured to said brace member, said retaining member having a leg following the rise of the panel at its said raised portion.

8. In vehicle underbody construction, in combination, a sheet metal floor panel having downwardly flanged side edges, cross tubular reenforcing members extending between and secured at their ends to said flanges toward the front and toward the rear of the panel, another tubular member extending lengthwise beneath the center of the panel and secured at its ends to said cross tubular members, and spacers between said panel and tubular members, intermediate their ends, whereby said panel is reenforced and stiffened intermediate its edges.

9. In vehicle underbody construction, a floor panel comprising a single piece of sheet metal having integral raised portions constituting toe risers.

10. In vehicle underbody construction, a floor panel comprising a single piece of sheet metal having integral raised portions constituting toe risers and floor board supporting flanges along said toe risers.

11. In vehicle underbody construction, a floor panel comprising a single piece of sheet metal having integral depressed portions constituting reenforcements, and having a floor board opening and integral floor board supporting flanges at said opening.

This specification signed this 12th day of November, 1923.

EDWARD A. WETZEL.